(12) United States Patent
Sagemueller et al.

(10) Patent No.: US 11,391,566 B2
(45) Date of Patent: Jul. 19, 2022

(54) ROTARY TABLE FOR A COORDINATE MEASURING APPARATUS

(71) Applicant: Carl Zeiss Industrielle Messtechnik GmbH, Oberkochen (DE)

(72) Inventors: Rainer Sagemueller, Aalen (DE); Christian Bayer, Langenau (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 343 days.

(21) Appl. No.: 15/720,225

(22) Filed: Sep. 29, 2017

(65) Prior Publication Data

US 2018/0094923 A1 Apr. 5, 2018

(30) Foreign Application Priority Data

Sep. 30, 2016 (DE) ..................... 10 2016 118 572.8

(51) Int. Cl.
 *G01B 5/00* (2006.01)
 *B23Q 16/10* (2006.01)
 *G01B 5/008* (2006.01)
 *G01B 21/04* (2006.01)

(52) U.S. Cl.
 CPC ........... *G01B 21/047* (2013.01); *B23Q 16/10* (2013.01); *G01B 5/0004* (2013.01); *G01B 5/008* (2013.01)

(58) Field of Classification Search
 CPC .......... B23Q 3/067; B23Q 3/12; B23Q 3/152; B23Q 16/10; G01B 21/047; G01B 5/0004; G01B 5/008
 USPC ........................................................ 269/57
 See application file for complete search history.

(56) References Cited

U.S. PATENT DOCUMENTS

| 5,187,874 A | * | 2/1993 | Takahashi | ............. G01B 3/002 |
| | | | | 33/502 |
| 7,460,970 B2 | | 12/2008 | Madlener et al. | |
| 7,918,033 B2 | | 4/2011 | Held | |
| 8,229,694 B2 | | 7/2012 | Nakagawa et al. | |

(Continued)

FOREIGN PATENT DOCUMENTS

| CN | 1847777 A | 10/2006 |
| CN | 101331436 A | 12/2008 |

(Continued)

OTHER PUBLICATIONS

Office Action issued in German Patent Application No. DE 10 2016 118 572.8, dated Sep. 18, 2017.

(Continued)

*Primary Examiner* — Lee D Wilson
*Assistant Examiner* — Aaron R McConnell
(74) *Attorney, Agent, or Firm* — Falk Ewers; Ewers IP Law PLLC

(57) ABSTRACT

A rotary table for a coordinate measuring apparatus for receiving and mounting a workpiece to be measured is provided. The rotary table has a rotatable main rotary table body and a clamping chuck, which is arranged on the rotatable main rotary table body and which has a clamping chuck receptacle for receiving the workpiece to be measured, the rotary table also having at least one master, which is arranged outside the clamping chuck receptacle, and/or at least one fastener for a master, which is provided in addition to the clamping chuck receptacle. In addition, a coordinate measuring apparatus with a corresponding rotary table is provided.

15 Claims, 2 Drawing Sheets

(56) References Cited

U.S. PATENT DOCUMENTS

| | | | |
|---|---|---|---|
| 8,336,219 B2 | 12/2012 | Grzesiak et al. | |
| 8,667,698 B2 | 3/2014 | Verdi et al. | |
| 8,875,603 B2 | 11/2014 | Maxted et al. | |
| 9,151,602 B2 | 10/2015 | Noda et al. | |
| 9,683,827 B2 | 6/2017 | Wimmer | |
| 2006/0201010 A1* | 9/2006 | Maier | B23Q 17/22 33/502 |
| 2009/0152823 A1* | 6/2009 | Bernhardt | B23B 31/16 279/43 |
| 2013/0139660 A1* | 6/2013 | Maxted | G05B 19/401 82/1.11 |
| 2015/0052768 A1* | 2/2015 | Wimmer | G01B 21/042 33/503 |
| 2015/0052770 A1* | 2/2015 | Noda | G01B 21/042 33/503 |

FOREIGN PATENT DOCUMENTS

| | | |
|---|---|---|
| CN | 101711343 A | 5/2010 |
| CN | 101769704 A | 7/2010 |
| CN | 101868691 A | 10/2010 |
| CN | 103591913 A | 2/2014 |
| CN | 102620623 B | 6/2016 |
| CN | 206132016 U | 4/2017 |
| EP | 2840354 A1 | 2/2015 |
| JP | 06249641 A | 9/1994 |
| JP | 2009271030 A | 11/2009 |
| JP | 5277033 B2 | 10/2010 |
| WO | 02090879 A2 | 11/2002 |
| WO | WO-02090879 A2 * | 11/2002 ............ G01B 5/008 |
| WO | 2013164344 A1 | 11/2013 |

OTHER PUBLICATIONS

European Standard DIN EN ISO 10360-3, Aug. 2000, and English language translation thereof.

English language translation of Office Action issued in German Patent Application No. DE 10 2016 118 572.8, dated Sep. 18, 2017.

Office Action dated May 29, 2019 issued in Chinese counterpart application No. 201710853869.4 and English-language translation thereof.

* cited by examiner

ROTARY TABLE FOR A COORDINATE MEASURING APPARATUS

CROSS REFERENCE TO RELATED APPLICATIONS

This application claims priority to German patent application DE 10 2016 118 572.8, filed Sep. 30, 2016, the entire content of which is incorporated herein by reference.

TECHNICAL FIELD

The present invention relates to a rotary table for a coordinate measuring apparatus and to a coordinate measuring apparatus with a rotary table.

BACKGROUND

Coordinate measuring apparatuses are used for measuring components and have a workpiece holder for mounting a workpiece or component to be measured. The workpiece holder is usually fixedly attached to a base of the coordinate measuring apparatus or mounted rotatably about an axis of rotation with respect to the base. Coordinate measuring apparatuses usually have a probe head that can be moved in three spatial directions and a probe element for probing the component, so that by contacting the workpiece or component it can be measured. The probe head of such a coordinate measuring apparatus can be moved along three independent spatial directions X, Y and Z in a way corresponding to a Cartesian XYZ coordinate system, in order to be able to reach any desired location within a measuring space.

If a rotary table is provided on the coordinate measuring apparatus for mounting the workpiece or component, the component to be measured can additionally be rotated into different positions. For this purpose, the rotary table has a rotatable main rotary table body for receiving the workpiece, which is rotatable about a rotary table axis of rotation. With rotatable mounting of the workpiece, however, the measured values that are captured with respect to the Cartesian XYZ coordinate system of the coordinate measuring machine must be converted into a coordinate system of the workpiece that rotates with the axis of rotation. It is therefore necessary for an exact measurement of the component that the position and orientation of the rotary table axis is known precisely in relation to the coordinate system of the coordinate measuring apparatus. The calibration of the axis of rotation is provided in DIN EN ISO 10360-3 for coordinate measuring apparatuses with additional axes of rotation, i.e., the determination of the position and orientation of the rotary table axis in relation to the coordinate system of the coordinate measuring apparatus.

Various methods for determining the position and orientation of the rotary table axis are available for this purpose, such as for example the so-called "one-sphere method", "the two-sphere method" or "the calibration of the rotary table axis by a test cylinder". These and further methods are described for example in WO 02/090879 A2 and U.S. Pat. No. 9,683,827.

In the case of coordinate measuring apparatuses with rotary tables, a distinction is also made between rotary tables with face plates and rotary tables with a clamping chuck. Rotary tables with face plates are usually used for relatively large components, which are fastened on the face plate by clamping means. For this purpose, the face plate has a plurality of fasteners, such as threaded bores, by way of which the clamping means can be fastened on the face plate. The clamping means can in this case be positioned on the face plate individually and independently of one another, so that even unsymmetrical workpieces can be received. In this way, a flexible arrangement of differently dimensioned workpieces is possible.

Often used on the other hand for relatively small components to be measured are rotary tables with a clamping chuck, such as a jaw chuck, in the case of which the clamping elements are clamped together such that they preferably receive the workpiece in the clamping chuck receptacle in a self-centering manner. For this purpose, at least two or three or more clamping elements, such as clamping jaws, are displaceably arranged in a main clamping chuck body, these elements being able to be moved and clamped by a common drive. In the case of small rotary tables, the clamping chucks, and in particular the main clamping chuck bodies, can cover the entire rotatable main rotary table body of the rotary table.

For such relatively small rotary tables with a clamping chuck, a reference object, known as a master, is arranged in the component holder, such as for example the jaw chuck, for the calibration of the rotary table axis. For example, for the calibration by the one-sphere method, a master with a sphere arranged eccentrically in relation to the rotary table axis is fastened in the jaw chuck.

Since, however, the rotary table only has one component holder, for calibrating the rotary table axis with a correspondingly offset sphere holder (master) it is necessary to unclamp a component that is on the rotary table and fit the master. This is particularly labor intensive whenever it is necessary for the calibration of the rotary table axis to be frequently repeated (recalibration), for example due to temperature influences or the like, since this necessitates a frequent change between the component to be measured and the master, which involves a great expenditure of time for the user.

In the case of a rotary table with a clamping chuck, there is also the problem that the clamped-in master does not have a definite position with respect to the rotary position in the rotary table or the corresponding component coordinate system, so that automated measurement of the rotary table axis is not possible.

SUMMARY

It is an object of the present invention to provide a rotary table for a coordinate measuring apparatus and a corresponding coordinate measuring apparatus that allows easier calibration and recalibration of the rotary table axis of a rotary table with a workpiece holder in the form of a clamping chuck.

To solve the problems described above concerning the calibration of the rotary table axis for rotary tables with a clamping chuck, such as for example a jaw chuck, the rotary table is provided with at least one master with which a calibration of the rotary table axis is possible or with a possibility for fastening a master outside the clamping chuck receptacle for receiving the workpiece to be measured.

The master may be arranged fixedly or detachably on the rotary table. In the case of a fixed arrangement, the master may be arranged in a material-bonding manner, for example by an adhesive connection, while in the case of a detachable arrangement an interlocking and/or frictionally engaging arrangement is possible. In particular, threaded bores in which a corresponding master can be arranged by screw connections may be arranged on the rotary table.

In addition, further elements or components may also be provided on the rotary table for the arrangement of a master.

The master and/or the single or multiple fasteners for fastening a master may be arranged eccentrically in relation to the rotary table axis and may in particular be arranged on an imaginary circular line around the rotary table axis. In the case of multiple masters and/or fasteners for fastening a master, at least two different imaginary circles with different circle radii in relation to the rotary table axis may be provided for the arrangement of the masters and/or the fastener therefor.

The master and/or the fastener for the master may be arranged on the rotary table in the main rotary table body or on the clamping chuck, in particular a jaw chuck, and preferably on the main clamping chuck body.

The master may protrude from the rotary table or the main rotary table body or the clamping chuck in an axial or radial direction with respect to the rotary table axis or a fastening device for the master may be arranged such that the arranged master protrudes from the rotary table or the main rotary table body or the clamping chuck in an axial or radial direction.

The masters may be spherical bodies that can be arranged on the rotary table or jaw chuck by way of a rod. Other configurations, such as cylinders, cones, inner cones or other curved or any desired areas are also conceivable. Here, the corresponding form may be formed directly on the main rotary table body or the clamping chuck, for example by forming a depression or spherical cap in the corresponding components of the rotary table.

The configuration of the master may be chosen in particular such that, as far as possible, the master does not disturb a component arranged in the workpiece holder or the jaw chuck of the rotary table and does not collide with it or hamper or hinder the measurement with a stylus.

BRIEF DESCRIPTION OF THE DRAWINGS

The invention will now be described with reference to the drawings wherein.

DESCRIPTION OF EXEMPLARY EMBODIMENTS

Figure 1:
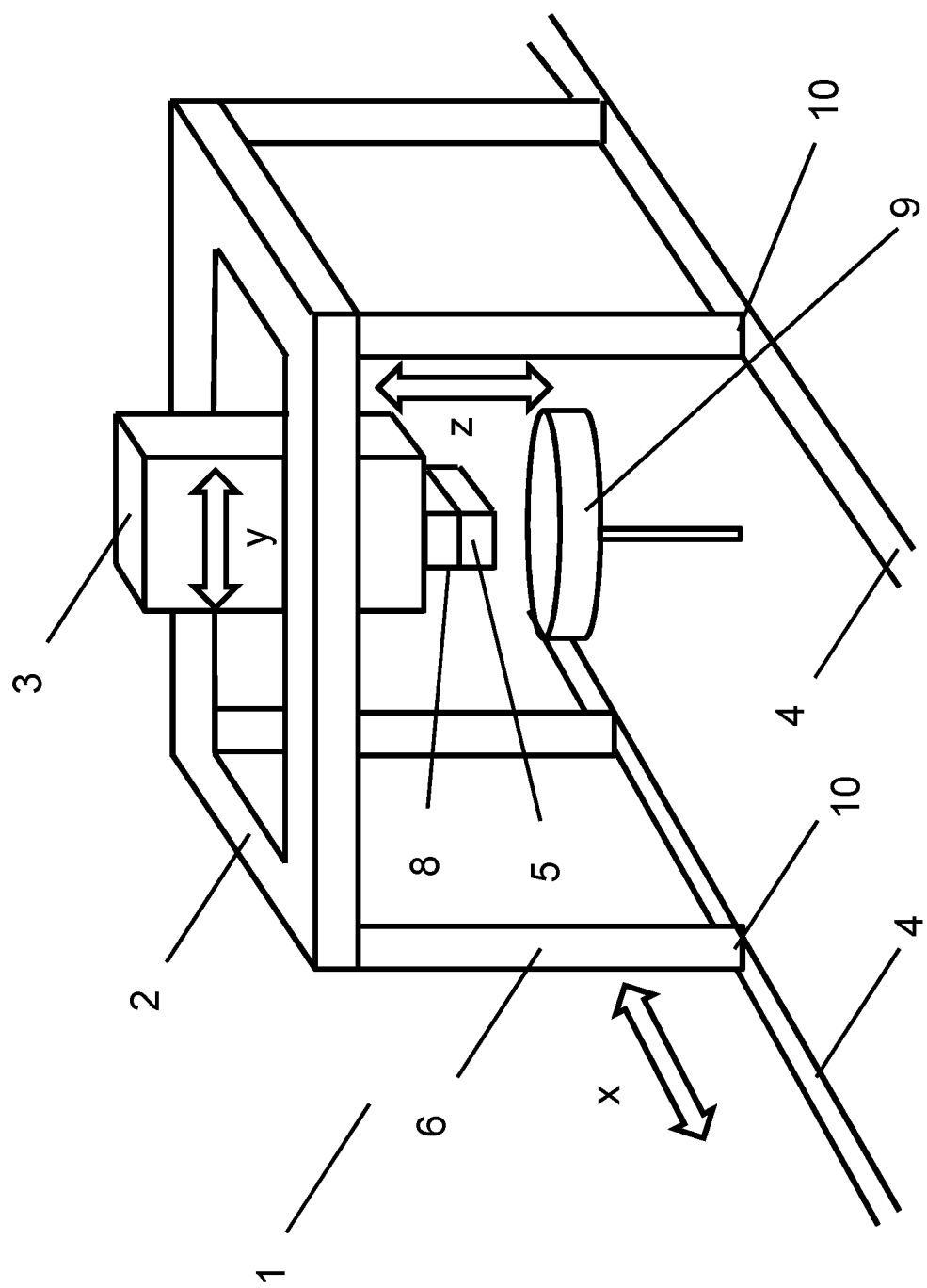
FIG. 1 shows a representation of a coordinate measuring apparatus.

FIG. 1 shows a coordinate measuring apparatus 1 according to an exemplary embodiment of the present invention. The coordinate measuring apparatus 1 includes a support structure with a movable gantry support 2, movably received in which there is in turn a carriage 3, on which a measuring system 5 is arranged in a vertically movable receptacle 8. The measuring system 5 may have at least one contactless, for example optical, capacitive or inductive, sensor and/or at least one tactile sensor, with which an object 9 to be measured can be sensed. In the case of an optical sensor, this can take place in a contactless manner, whereas with a tactile sensor the dimensions and/or form of the object 9 to be measured is/are determined by corresponding contact with the object 9 to be measured.

The gantry support 2 is movable along a rail arrangement including rails 4, the longitudinal extent of the rails 4 corresponding to the X direction, so that the measuring system 5 can be adjusted in the X direction by moving the gantry support 2 along the rails 4. The carriage 3 can be moved in the gantry support 2 in a direction transverse to the X direction, to be specific the Y direction, a movement of the measuring system 5 with the receptacle 8 that is vertically movable in the carriage 3 perpendicularly in relation to the plane defined by the X and Y directions additionally being possible, so that the measuring system 5 can be moved along the coordinate axes X, Y and Z to any desired point in the measuring space defined by the coordinate measuring apparatus 1.

The workpiece to be measured may be mounted on the rotary table 9 and brought into different rotary positions by a rotation of the rotary table 9.

Figure 2:
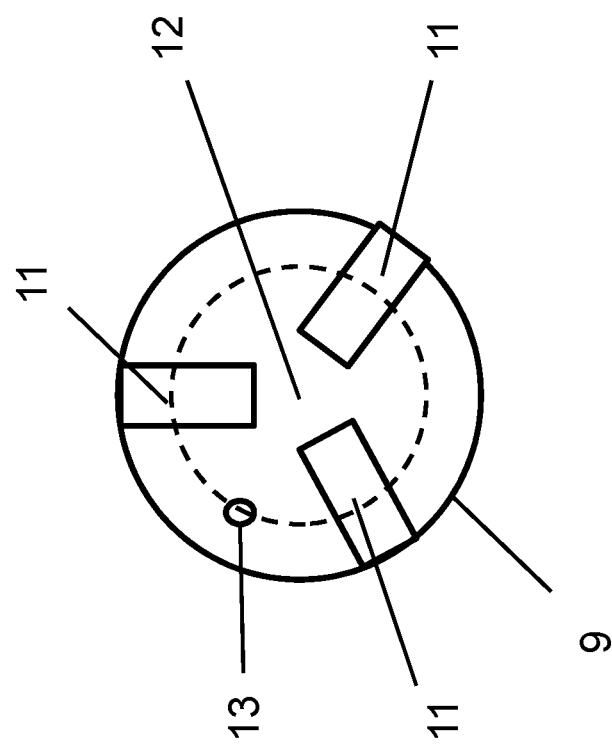
FIG. 2 shows a plan view of a rotary table according to an exemplary embodiment of the invention.

FIG. 2 shows a plan view of a rotary table 9, which has as a workpiece holder a three-jaw chuck with three clamping jaws 11, which in their middle define a receiving space 12 for the component to be measured. The rotary table axis of rotation, about which the rotary table 9 can be rotated, runs through the centre of the rotary table 9 or the receiving space 12.

A master or a fastener 13 for a master for calibrating the rotary table axis of rotation is arranged on a circular line around the rotary table axis of rotation that is represented by a dashed line. In the exemplary embodiment shown, the fastener 13 is a threaded hole 13 into which the master can be screwed.

Figure 3:
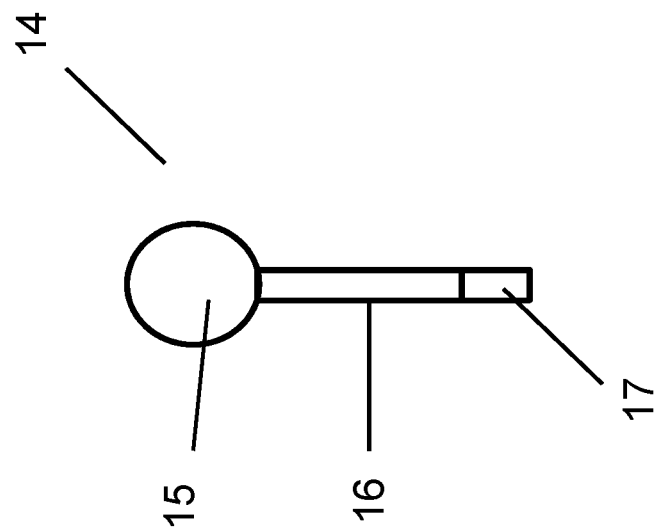
FIG. 3 shows a representation of a master.

The master 14, which can be screwed into the threaded hole 13, is shown in FIG. 3. It is a spherical body including a sphere 15, which is arranged at one end of a shaft 16, a threaded portion 17, with which the spherical body can be screwed into the threaded hole 30 of the rotary table 9 in order to be measured for the calibration of the rotary table axis of rotation, being formed at the other end of the shaft 16.

Although the present invention has been described in detail by way of the exemplary embodiments, it is obvious to a person skilled in the art that the invention is not restricted to these exemplary embodiments but rather that modifications are possible such that individual features can be omitted or different types of combinations of features can be performed, as long as there is no departure from the scope of protection of the appended claims. The present disclosure includes all combinations of the individual features presented.

LIST OF REFERENCE NUMERALS

1 Coordinate measuring apparatus
2 Gantry support
3 Carriage
4 Rail
5 Measuring system
6 Column
8 Receptacle
9 Rotary table
10 Air bearing arrangement
11 Clamping jaw
12 Receiving space for a component to be measured
13 Fastener (threaded hole) for a master
14 Master
15 Sphere
16 Shaft
17 Threaded portion

What is claimed is:

1. A rotary table for a coordinate measuring machine for receiving and mounting a workpiece to be measured, the rotary table comprising:

a main rotary table body rotatable about a rotary table axis;

a clamping chuck arranged on the rotatable main rotary table body rotatable about the rotary table axis, the clamping chuck including a main clamping chuck body and a plurality of clamping elements jointly driven and clamped by a drive, wherein the plurality of clamping elements form a clamping chuck receptacle configured to receive the workpiece to be measured;

at least one of (a) a master arranged outside the clamping chuck receptacle and (b) a fastener for the master provided in addition to the clamping chuck receptacle;

and each of the at least one of (a) the master and (b) the fastener for the master being arranged on a circular line around the rotary table axis between two of the plurality of clamping elements.

2. The rotary table according to claim 1, wherein the clamping chuck is a jaw chuck.

3. The rotary table according to claim 1, wherein the master is fixedly arranged on the rotary table.

4. The rotary table according to claim 1, wherein the master is detachably arranged on the rotary table.

5. The rotary table according to claim 1, wherein:

a plurality of masters or fasteners for the masters are arranged on a same circular line or on different circular lines around the rotary table axis.

6. The rotary table according to claim 1, wherein the at least one of the master and the fastener for the master are arranged on a main body of a jaw chuck.

7. The rotary table according to claim 1, wherein the master and/or the fastener for the master are formed such that the master protrudes from the rotary table parallel to or radially away from the rotary table axis.

8. The rotary table according to claim 1, wherein the master and/or the fastener for the master are formed such that the master protrudes from the rotatable main rotary table body parallel to or radially away from the rotary table axis.

9. The rotary table according to claim 1, wherein the master has at least one of a spherical body, a part of a spherical body, a cylinder, a part of a cylinder, a cone, an inner cone, or an arbitrarily shaped surface.

10. A coordinate measuring apparatus comprising a rotary table according to claim 1.

11. The rotary table according to claim 1, wherein the at least one of the master and the fastener for the master are arranged on the clamping chuck.

12. The rotary table according to claim 1, wherein the master and/or the fastener for the master are formed such that the master protrudes from the clamping chuck parallel to or radially away from the rotary table axis.

13. The rotary table according to claim 1, wherein the master is arranged on the rotary table in a material-bonding or interlocking or frictionally engaging manner.

14. The rotary table according to claim 1, wherein the master is arranged on the rotary table by a screw connection.

15. The rotary table according to claim 1, wherein the at least one of the master and the fastener for the master are arranged on the rotatable main rotary table body.

* * * * *